(No Model.)

T. F. WELLS.
NUT LOCK.

No. 429,785. Patented June 10, 1890.

WITNESSES.
Frank G. Parker
Matthew M. Blunt.

INVENTOR
Thomas F. Wells
by his attorney
Alx. L. Hayes.

UNITED STATES PATENT OFFICE.

THOMAS F. WELLS, OF WINCHESTER, MASSACHUSETTS, ASSIGNOR TO THE MECHANICAL MANUFACTURING COMPANY, OF NASHUA, NEW HAMPSHIRE.

NUT-LOCK.

SPECIFICATION forming part of Letters Patent No. 429,785, dated June 10, 1890.

Application filed March 14, 1890. Serial No. 343,834. (No model.)

*To all whom it may concern:*

Be it known that I, THOMAS F. WELLS, of Winchester, in the county of Middlesex and State of Massachusetts have invented a new and useful Improvement in Nut-Locks, of which the following, taken in connection with the accompanying drawings, is a specification.

My invention relates to improvements in nut-locks having a screw locking-pin and a plate recessed to be engaged by the pin.

The invention has for its object to prevent the locking screw-pin from being loosened or turned out of the nut by the effect of the expansion and contraction of the nut or the jars to which the structure in which the device is used is subjected; and to this end it consists in the combination, substantially as hereinafter more fully set forth, with the nut, of a screw locking-pin whose extremity is provided with one or more flat surfaces, and of a non-rotating detachable plate provided with recesses having flat surfaces for receiving the end of the pin.

Figure 1:
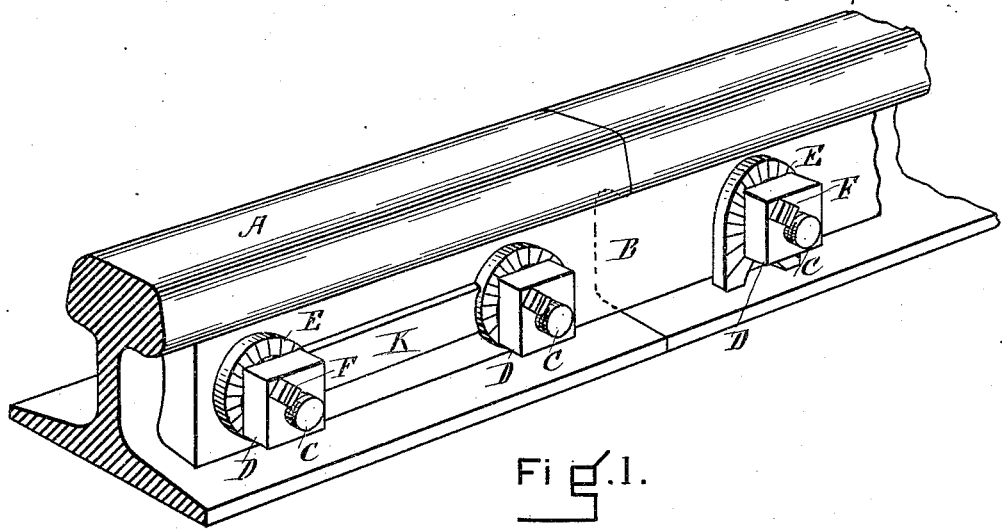
Figure 2:
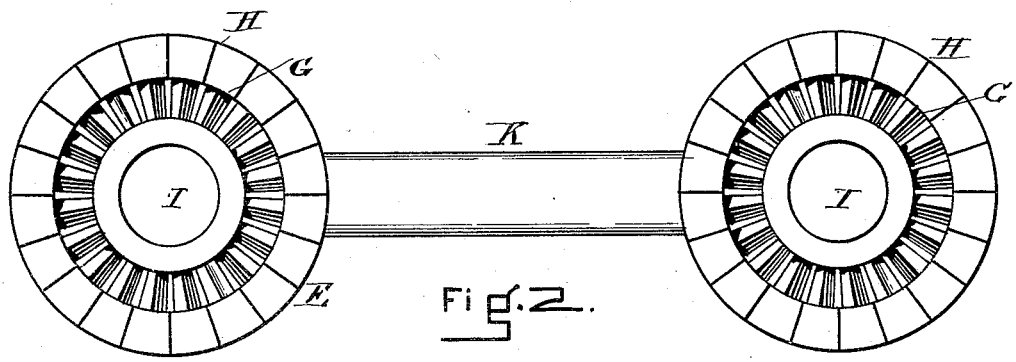
Figures 3, 4, 5, 6, 7, 8:
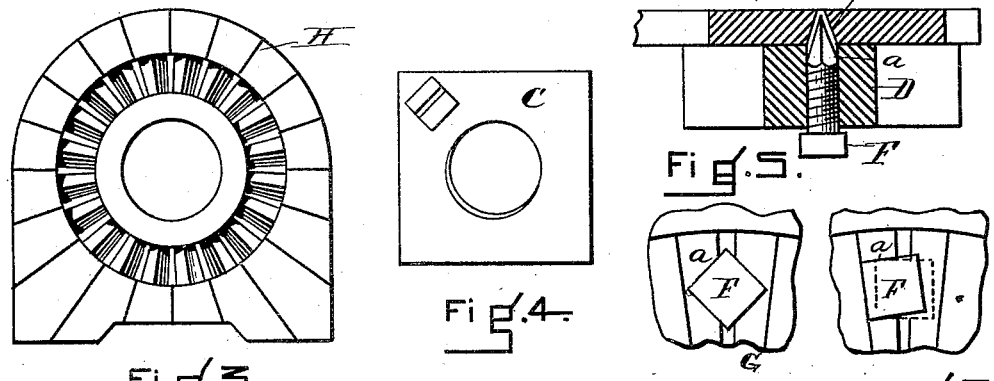

In the accompanying drawings, Figure 1 is a perspective view of a railroad-rail and fish-plate having my improved nut-lock attached thereto. Fig. 2 is a front view of two circular non-rotating detachable plates connected together by a bar. Fig. 3 is a front view of another form of non-rotating detachable plate. Fig. 4 is a front view of the nut. Fig. 5 is a sectional view of the plate, nut, and locking-pin. Fig. 6 is a diagram showing the position of the pin when inserted into the recess in the plate. Fig. 7 is a diagram showing the position of the pin when locked, and Fig. 8 is a sectional view of a pin having a straight end inserted into a recess having parallel and perpendicular sides.

In these several figures the same letters refer to the same parts.

Referring to the drawings, A is the railroad-rail.

B is the fish-plate.
C is the bolt.
D is the nut.
E is the non-rotating detachable plate.
F is the locking-pin.

G are the recesses in the plate, and H are the radial lines on the plate by means of which the perforation in the nut is centered over a recess in the plate. The recesses are contiguous to one another and are arranged concentrically to the perforation I, through which the bolt passes, and are made with flat sides. These sides may be inclined to one another, so as to form tapered recesses, as shown in Figs. 2, 3, 5, 6, and 7, or the sides may be perpendicular, as shown in Fig. 8, but in this case the recesses cannot be as near to one another as when they are tapered. The end of the pin F is formed with one or more flat sides, preferably four, and this end may be tapered, as shown in Fig. 1, or perpendicular, as shown in Fig. 8. I prefer tapered recesses and a pin with a tapered end formed with four flat sides, and also that the recesses should extend through the plate. The width of the recesses is slightly greater than the diameter of the pin. When the nut has been screwed onto the bolt to the desired extent, the pin is screwed home into the supplemental perforation and its extremity enters loosely into a recess, as shown in Fig. 6. The pin is then reversed and turned until one of the flat faces is opposed to the side of the recess, as shown in dotted lines in Fig. 7, and the nut is then turned off the bolt until one of the flat sides of the pin bears against the wall or side of the recess, as shown in full lines in Fig. 7. The nut is thus locked and prevented from being turned off the bolt, and the pin is also prevented from turning out. Both nut and pin are thus locked.

When it is desired to take off the nut, it is turned slightly on the bolt until the end of the pin comes into the middle of the recess in the plate, when the pin can be screwed out until its extremity is beyond the recess.

Having thus described my invention, what I claim, and desire to secure by Letters Patent of the United States, is—

Means for locking a nut in place consisting of a non-rotatable plate, through which the bolt passes, provided with a series of recesses having a flat side, and a screw passing through the nut having its inner end of less diameter than the width of the recess and having one or more flat faces adapted to be brought into contact with the flat face of the recess and thus secure the parts from movement with respect to each other in the manner set forth.

In testimony whereof I have signed my name to this specification, in the presence of two subscribing witnesses, on this 11th day of March, A. D. 1890.

THOMAS F. WELLS.

Witnesses:
ALEX. L. HAYES,
CHAS. R. TUCKER, Jr.